(No Model.)
W. J. PHELPS.
BLANK FOR THE MANUFACTURE OF TIN CANS.
No. 495,706. Patented Apr. 18, 1893.
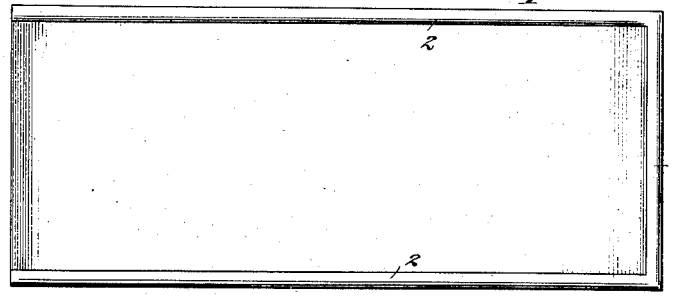
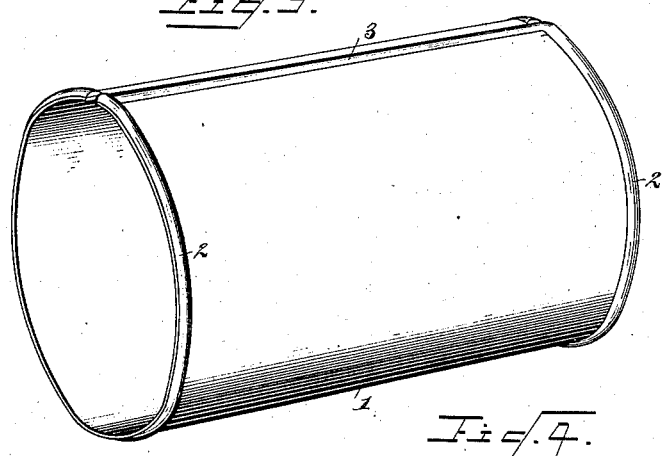
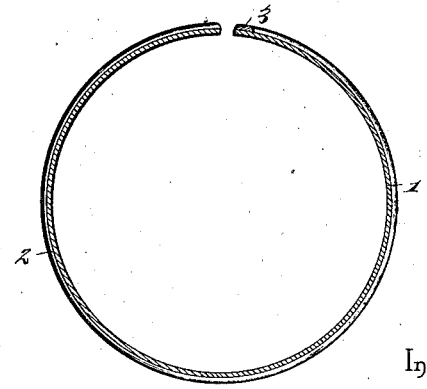
Witnesses
Inventor
Walter J. Phelps.
By his Attorneys,
C.A. Snow & Co.

United States Patent Office.

WALTER J. PHELPS, OF BALTIMORE, MARYLAND.

BLANK FOR THE MANUFACTURE OF TIN CANS.

SPECIFICATION forming part of Letters Patent No. 495,706, dated April 18, 1893.

Application filed November 4, 1890. Serial No. 370,303. (No model.)

*To all whom it may concern:*

Be it known that I, WALTER J. PHELPS, a citizen of the United States, residing at Baltimore, in the State of Maryland, have invented a new and useful Can-Blank for the Manufacture of Tin Cans, of which the following is a specification.

This invention relates to can blanks employed in the manufacture of tin cans; and it consists more especially in the preliminary preparation of a sheet or blank from which the cans are to be constructed.

The object of the invention is to provide such sheet or blank along its edges with a layer of solder so that the edges may be subsequently seamed or connected by the application of heat, thereby melting the solder and finishing the joints. By my present invention I aim to apply the solder to one side of the sheet only, thereby economizing material and enabling neat work to be performed, all as will hereinafter be more fully described and particularly pointed out in the claims.

In the drawings hereto annexed—Figure 1 is a plan view of a sheet or blank prepared in accordance with my invention. Fig. 2 is a transverse sectional view of the same. Fig. 3 is a perspective view of a sheet or blank prepared in accordance with my invention, showing the same crimped or bent into an approximately cylindrical shape. Fig. 4 is a transverse sectional view of the construction disclosed in Fig. 3.

Like numerals of reference indicate like parts in all the figures.

1 designates a sheet of tin which is cut of a suitable size and in a rectangular shape to form a can of the required size. One side of the said sheet, which is to form the outer side of the can, is provided along its edges with a layer of solder as shown at 2—2, and a similar layer of solder 3 is placed at one end of the said sheet. These so-called layers of solder are only just wide enough to form the desired seams, say from one-eighth to three-sixteenths of an inch, and they may be applied to the sheet in any convenient manner. Thus, for instance, the edges of the sheet may be dipped in a solder bath while one side of the sheet is held firmly in contact with a sheet of slate or similar material to which the solder will not adhere, but it will of course be understood that any suitable machine may be employed for applying the solder to the edges of the sheet to form a blank such as specified.

It is to be understood that the beads of solder are applied to the two edges and one end of said sheet when in a molten state, and by means of any suitable device. At the same time as the application of the solder, the sheet to which the solder is applied, is crimped or folded into an approximately cylindrical shape such as clearly shown in Figs. 3 and 4 of the drawings.

In order to make the side seam of the can it is of course necessary that the sheet should be bent or crimped, and while this may of course be done by a separate operation, it is nevertheless quite obvious that an essential improvement is effected by having the can blank crimped or bent into a shape ready for use at the same time as the application of the solder, and as previously stated this may be effected by means of any suitable device, which, forming no part of the present invention is not illustrated or described.

In the manfacture of a can from a sheet prepared in accordance with my invention, it is simply necessary to bring one end of the sheet in contact with the opposite end to which solder has been applied. Heat is then applied in any suitable manner so as to melt the solder and finish the seam, which is of the kind commonly known to the trade as the ordinary "soak seam." The caps, which are to form the top and bottom of the can and which have been previously prepared in the usual manner, are then placed in position and the seam finished as before, by the simple application of heat.

By my invention much time may be saved in the manufacture of tin cans which has been heretofore consumed in the application of the solder. Material is also greatly economized, inasmuch as the solder is applied to one side of the sheet only, and only in such quantities as are absolutely required to form the seams.

From the foregoing it is thought that the construction, and many advantages of the herein-described can blank will be apparent to those skilled in the art without further description.

Having thus described my invention, I claim and desire to secure by Letters Patent of the United States—

1. A blank for the manufacture of tin cans, consisting of a rectangular sheet, one side of which is provided with solder applied when in its molten state to the two edges and one end of said sheet, substantially as and for the purpose herein set forth.

2. A blank for the manufacture of tin cans consisting of a rectangular sheet, one side of which is provided with solder applied to the two edges and one end of said sheet, the latter being crimped or bent into an approximately cylindrical shape, substantially as set forth.

In testimony that I claim the foregoing as my own I have hereto affixed my signature in presence of two witnesses.

WALTER J. PHELPS.

Witnesses:
J. H. SIGGERS,
E. G. SIGGERS.